2,933,659

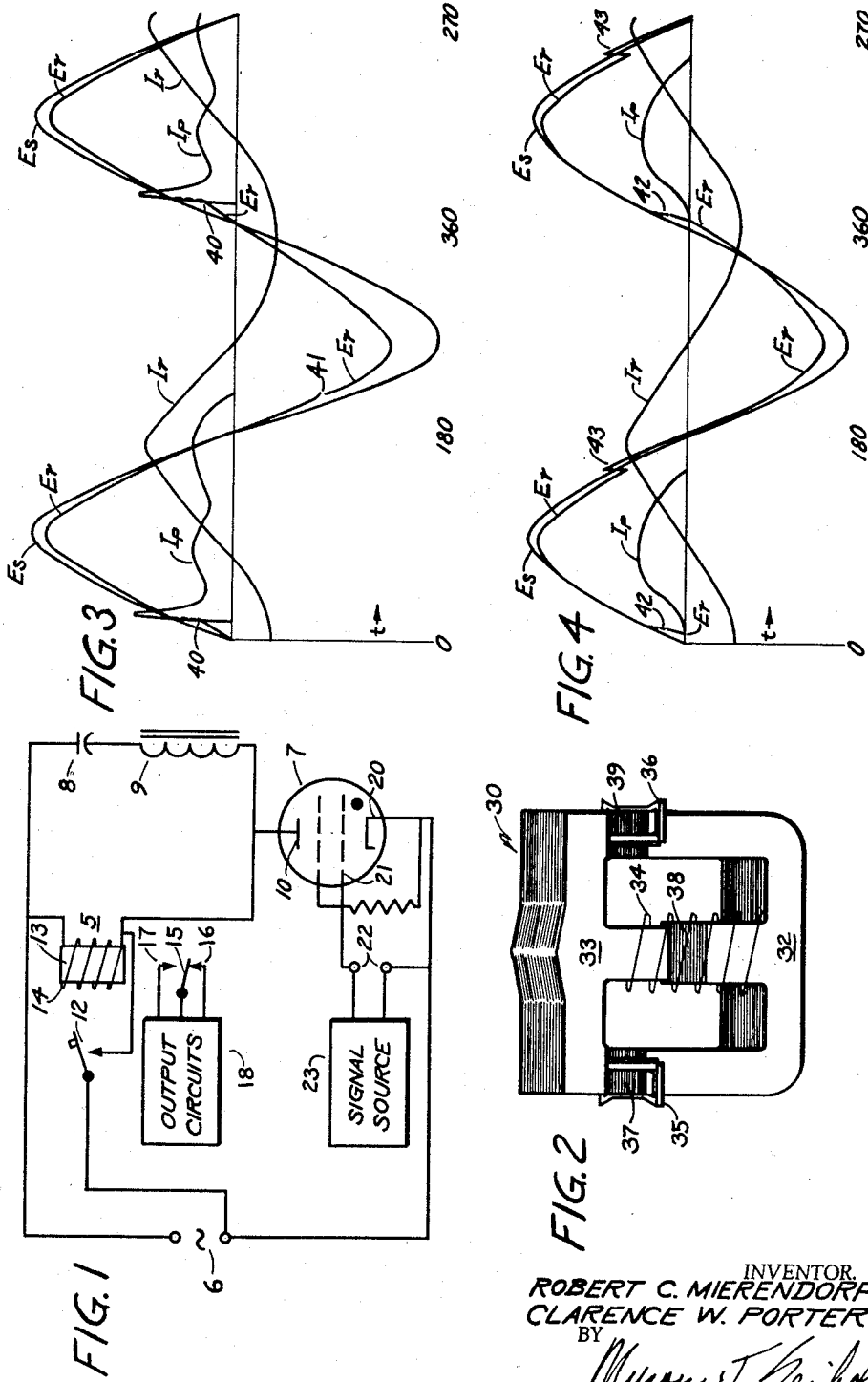
April 19, 1960    R. C. MIERENDORF ET AL    2,933,659
ALTERNATING CURRENT RELAY CIRCUITS
Filed Nov. 23, 1956
INVENTOR.
ROBERT C. MIERENDORF
CLARENCE W. PORTER
BY United States Patent Office 2,933,659
Patented Apr. 19, 1960

ALTERNATING CURRENT RELAY CIRCUITS

Robert C. Mierendorf and Clarence W. Porter, Wauwatosa, Wis., assignors to Square D Company, Detroit, Mich., a corporation of Michigan Application November 23, 1956, Serial No. 624,017

7 Claims. (Cl. 317—149)

The present invention relates to alternating current relay circuits and more particularly to alternating current relay circuits supplied from an unsymmetrical alternating current source.

Generally, the circuit embodying the present invention includes a circuit for controlling the periods of energization of an alternating current relay which has a unidirectional or nonsymmetrical current output about the X axis and unsuitable for operation of an alternating current magnet or solenoid of a relay or contactor. In order to operate the magnet of the relay or contactor from the nonsymmetrical alternating current output, an impedance is connected in parallel with the coil of the magnet having an inductive reactance component coupling the nonsymmetrical output to a capacitive reactance component of the impedance and providing a parallel resonant circuit in combination with the coil of the magnet at the frequency of the unsymmetrical output to produce a symmetrical alternating magnetizing current in the coil of the alternating current magnet. The resulting relay circuit prevents chattering of the magnet for quiet operation, limits peak current outputs of the control circuit and reduces heating of the magnet coil without elaborate or extensive circuitry heretofore required to provide a symmetrical alternating current or convert a nonsymmetrical alternating power to a symmetrical alternating current suitable for energization of a magnet or solenoid of an alternating current relay. It is an object thereofore of the present invention to provide a relay circuit having the foregoing features and advantages.

Another object is to provide symmetrical alternating current waveforms for an alternating current magnet in an output circuit of a nonsymmetrical conducting device.

A further object of the invention is the provision of symmetrical alternating current power in the output circuit of a nonsymmetrical conducting device.

Still another object is to provide quiet operation of an alternating current magnet from a unidirectional alternating source or nonsymmetrical power output device.

Another object of the present invention is the provision of a noiseless operation of an alternating current magnet controlled by a unidirectional conducting device.

A still further object is to provide quiet operation of an alternating current relay in the output circuit of a unidirectional control circuit without exceeding the current rating of said circuit.

Still another object is the provision for the control of an alternating current relay by a grid controlled gaseous discharge device.

A further object is the provision of a symmetrical alternating current power for an alternating current relay controlled by a grid controlled gaseous discharge device.

Still another object is to provide for quiet operation of an alternating current relay controlled by a gaseous discharge device.

Further objects and features of the invention will be readily apparent to those skilled in the art from the specification and appended drawing illustrating certain preferred embodiments in which:

Fig. 1 is a circuit diagram of the preferred embodiment of the invention.

Fig. 2 illustrates a typical alternating current relay or contactor magnet.

Fig. 3 is a graph illustrating unsymmetrical wave forms causing chatter or noisy relay operation.

Fig. 4 is a graph showing typical waveforms of symmetrical relay currents and voltages of the circuit shown in Fig. 1 and quiet relay operation.

Referring now to the drawings, there is shown in Fig. 1, illustrating the preferred embodiment, an alternating current relay or contactor 5 connected in a relay control circuit supplied from an alternating current source 6. The relay 5 is connected across the source 6 in series with the discharge device 7 shown as a grid controlled gaseous discharge tube or thyratron. Capacitor 8 and inductor 9 are connected in series in the plate circuit of the tube 7 and in parallel with the relay 5 wherein the capacitor 8 is adjusted or selected to produce parallel resonance in the relay energizing circuit in combination with the inductive reactance of the inductor 9 and the coil of the alternating current relay 5.

The alternating current relay or contactor magnet or solenoid includes a stationary core 13 and magnetic coil or winding 14, and armature 15 cooperating with associated contacts 16 and 17. The magnetic coil may be operated directly across the supply lines connected to the alternating current source 6 by closing contacts 12 or to the anode 10 when operated by the tube control circuit. The alternating current relay 5 therefore, may be operated either by a series switch or a series grid controlled discharge device as shown in the present circuit embodiment. The armature and contact arrangement as well as the coupling to the output circuits 18 is intended to be illustrative only, wherein the output circuits may be controlled by the position number or arrangement of the relay contacts.

The discharge device control circuit arrangement includes a signal source 23 supplying a grid signal to the control electrode 21 of the tube 7 causing the tube to conduct during controlled intervals predetermined by the signal source 23, to supply the relay and the remainder of the anode circuit with current on the positive swing of the supply voltage 6. The series connection of the control circuit includes tube cathode 20 connected to the supply source 6 and one side of the signal source 23 by the signal source terminals 22.

Although the alternating current relay 5 may employ a solenoid, an E magnet 30 has been illustrated in Fig. 2 having stationary core 32 of thin insulated laminations to reduce iron losses and a center leg extending into the coil 34. The remaining outside legs of the stationary core 32 include shading coils 35 and 36 embedded in individual pole faces 37 and 39 respectively to prevent momentary opening of the armature during each flux reversal and resulting chattering of the magnet. The shading coils 35 and 36 are short circuited loops of conducting material either punched or formed of wire, for inducing alternating current in the loops by the main flux of the magnet. The resistance and reactance of the shading coil has been proportioned so that the current induced in the shading coils is approximately 90° out of phase with the main flux whereby the shading coil contributes an auxiliary flux holding the magnet armature closed during the interval the main flux passes through zero.

The armature 33 of the magnet may be formed from thin insulated laminations and include pole faces which oppose pole faces 37, 38 and 39 of the stationary core, and a center leg extending into the magnetic coil or winding 34. The chattering of the magnet, causing noise and nearly destruction of the pole faces by high mechanical stresses, occurs at the opposing pole faces or sealing surfaces of the armature and stationary core during intervals in which the magnetizing current drops to a value insufficient to hold the armature closed or less than the force of gravity or contact springs on the armature.

The shading coils produce a magnetizing current when the magnetizing current produced by the supply voltages passes through zero; however, in a tube circuit the tube conducts magnetizing current only on the positive half cycle and the anode circuit must include components, in addition to the relay, for supplying a voltage to the relay coil 14 during the negative swing or interval of the supply source 6. The energy stored in the magnetic coil of the relay 5, the inductor 9 and the capacitor 8 in combination supply the voltage and magnetizing current for the relay during the interval the supply source is negative and the inductor limits the peak current of the tube 7. Objectionable or excessive peak currents are transient and may occur during the first half cycle of conduction of the tube 7 in which the most aggravated condition exists when the tube 7 conducts at a control angle of 90°, or peak voltage of the supply source 6 during the first positive half cycle.

The wave forms in Fig. 3 are typical for a tube control circuit in which a resistor has been substituted for the inductor 9 whose value is adjusted to limit the peak tube currents to the rated current of the tube. The capacitor 8, in a circuit employing a resistor, is adjusted for parallel resonance whereby the energy stored in the winding of the relay and the capacitor supplies the relay voltage during the negative swing of the supply voltage.

As shown by the current wave form $Ir$, the anode circuit, including the resistor, produces an unsymmetrical relay magnetizing current having a unidirectional component and a chattering or noisy relay magnet even at higher supply voltages $Es$. With the resistor in the anode circuit as much as 20% higher supply voltages are required than with the inductor 9 without satisfactorily eliminating the noise or chattering of the magnet due to unsymmetrical magnetizing currents and voltages. Further, although a resistor has been provided for limiting the peak tube currents, peak current transients and the total R.M.S. value of the power input are substantially higher than the circuit employing the inductor 9 wherein the unidirectional component in the resistor relay circuit is dissipated in heat in the resistor and alternating current magnet. The ratio of positive to negative amplitudes is approximately 3:1 and has a very short decay time period.

During the intervals 40 and 41 of the relay voltage curve $Er$ in Fig. 3, the voltage supplied to the relay transfers from the parallel resonant circuit to the tube circuit, more specifically, the interval 40 indicates transfer from the voltage supplied by the resonant circuit to the tube circuit; and interval 41, transfer from the tube circuit to the resonant circuit. The transfer time period can be more clearly seen by reference to the tube current curve $Ip$, wherein the tube starts conduction at time interval 40 and cuts off at time interval 41.

Without regard to peak tube currents, the resonant circuit employing the resistor was modified to decrease the resistance and thereby attempt to eliminate chatter of the magnet for satisfactory quiet operation. A 5% reduction in supply voltage was feasible but did not reduce the noise level of the magnet to the noise level of the resonant circuit of the inductor 9, even when the resistor was completely bypassed for optimum relay circuit operation. However, excessive peak currents on the order of 2 to 3 times the tube rating prevents the use of this circuit for normal operation unless tubes of higher current capacity are substituted in the circuit.

Referring now more particularly to the waveforms for the circuit of the present invention employing the inductor 9 shown in Fig. 4, a 20% lower supply voltage $Es$ produces a symmetrical magnetizing current $Ir$, and flux and relay voltage $Er$ with substantially lower plate or tube current $Ip$. The waveforms for Figs. 3 and 4 are directed to the same form and size magnet as shown in Fig. 2, whereby a proper comparison can be made for determining supply voltages and resulting plate currents $Ip$, relay voltages $Er$, and magnetizing current $Ir$ and flux required for optimum operation. The recurrent intervals of transfer from resonating circuit supply to plate supply 42 and 43 have also been indicated for the circuit of Fig. 1 in the waveforms of Fig. 4.

*Operation*

The relay control circuit including the tube 7 controlled from the signal source 23 determines the period of energization of the relay circuit from the supply source 6. Upon application of the control signal to the grid 21 of the tube 7 causing the tube to conduct, a current $Ip$ shown in Fig. 4 is supplied to the relay circuit. During the period of conduction of the tube 7, $Er$ is applied across the relay coil 14 but during the remaining portion of the cycle $Er$ is supplied across the relay from the energy stored in the relay circuit. The energy stored in the relay coil, inductor 9 and capacitor 8 produces a current $Ir$ in the relay coil during the intervals of non-conduction of the tube 7 to swing the current negative a sufficient amount to produce a symmetrical alternating current in the relay coil 14. Energization of the relay 5 or magnet 30, shown in Fig. 2, not only prevents chatter resulting from momentary opening of the sealing surfaces but also quiet relay operation and normal coil heating.

In the circuit as shown, energization of the relay 5 opens contacts 16 to the output circuits and closes the contacts 17 to other output circuits.

Contacts 12 have been provided for operation or energization of the relay coil directly from the supply source 6 connecting the relay coil 14 directly across the voltage source shown in the waveforms as $Es$.

While certain preferred embodiments of the invention have been specifically disclosed, it is understood that the invention is not limited thereto, as many variations will be readily apparent to those skilled in the art and the invention is to be given its broadest possible interpretation within the terms of the following claims:

What is claimed is:

1. In a circuit controlled by a gas filled electronic tube from an alternating current supply, an alternating current magnet including a magnet coil, circuit means coupling the tube device to the coil for producing a symmetrical magnetizing current in said coil to energize said magnet, said circuit means including a capacitor and inductance in series with each other and connected in parallel with said coil wherein the capacitor is coupled to said device by the inductance.

2. In a circuit controlled by a gas filled conducting device from an alternating current supply, an alternating current solenoid including a solenoid coil, circuit means coupling the device to the coil and supply for producing a symmetrical magnetizing current in said coil to energize said solenoid, said circuit means including capacitive and inductive elements in a series circuit that is connected in parallel with said coil wherein the capacitive element is coupled to said device by the inductive element.

3. In a control circuit including an alternating current supply and a gas filled electronic tube, an alternating current magnet including a magnet coil connected in series circuit with the tube and supply, circuit means coupling said coil to the circuit output for producing a substantially symmetrical magnetizing current in said coil, said circuit means including an inductor and capacitor in a series circuit that is connected in parallel with the coil of said magnet and in series with the supply and tube.

4. In a control circuit including an alternating current supply and a gas filled electronic tube for supplying a nonsymmetrical power output to an alternating current magnet including a magnet coil, circuit means for producing a substantially symmetrical magnetizing current in said coil including an inductor and a capacitor in series circuit with each other and connected in parallel with the coil of said magnet wherein the capacitor is coupled to said output by said inductor and in combination with said magnet coil and the inductor is adjusted to the frequency of said output to produce parallel resonance.

5. In a control circuit including an alternating current supply and a gas filled electronic tube connected in series and providing a nonsymmetrical power output, an alternating current relay including a relay coil, circuit means coupling said coil to the output for producing a substantially symmetrical magnetizing current in said coil including a relay circuit having inductive and capacitive reactance elements connected in series with each other and connected in parallel with the winding of said relay wherein the capacitive reactance is coupled to said output by said inductive reactance and, in combination with said winding and inductor, is adjusted to the frequency of the power output to provide parallel resonance in said relay circuit at the power output frequency.

6. In a control circuit including an alternating current source, a gas filled tube and an alternating current relay coil wherein the coil is supplied by a nonsymmetrical current input circuit means for producing a substantially symmetrical magnetizing current through said coil including a magnet circuit having an inductor and a capacitor connected in series with each other and both connected in parallel with the coil of said magnet wherein the capacitor in combination with said coil and inductor is adjusted to the frequency of said current input to produce a parallel resonant magnet circuit and the capacitor is coupled to said current input by said inductor.

7. A circuit for producing a symmetrical alternating current in the coil of an alternating current magnet from a series connected alternating current source and a gas filled electronic tube which provides a series connected alternating current source and a gas filled electronic tube which provides a nonsymmetrical current to said coil, comprising; a magnet circuit including an impedance connected in series with the source and tube in parallel with the magnet coil and having an inductive reactance component and a capacitive reactance component producing parallel resonance in said magnet circuit at the frequency of said input and a symmetrical alternating magnetizing current in the coil of said alternating current magnet.

References Cited in the file of this patent

UNITED STATES PATENTS

| | | |
|---|---|---|
| 1,537,101 | Whiting | May 12, 1925 |
| 2,469,281 | Stafford | May 3, 1949 |
| 2,496,975 | Bach | Feb. 7, 1950 |
| 2,667,590 | Langberg | Jan. 26, 1954 |
| 2,694,163 | Sola | Nov. 9, 1954 |
| 2,774,015 | White | Dec. 11, 1956 |

UNITED STATES PATENT OFFICE
CERTIFICATE OF CORRECTION

Patent No. 2,933,659                              April 19, 1960

Robert C. Mierendorf et al.

It is hereby certified that error appears in the printed specification of the above numbered patent requiring correction and that the said Letters Patent should read as corrected below.

Column 6, lines 12 to 14, strike out "series connected alternating current source and a gas filled electronic tube which provides"

Signed and sealed this 11th day of April 1961.

(SEAL)
Attest:

ERNEST W. SWIDER
Attesting Officer

ARTHUR W. CROCKER
Acting Commissioner of Patents